July 10, 1956 L. W. DROEL 2,754,371

TELEPHONE SUBSET

Filed April 23, 1952 4 Sheets-Sheet 1

INVENTOR

LOUIS W. DROEL

BY T. L. Bowes

ATTORNEY

July 10, 1956 L. W. DROEL 2,754,371

TELEPHONE SUBSET

Filed April 23, 1952 4 Sheets-Sheet 2

INVENTOR

LOUIS W. DROEL

BY T. L. Bowes

ATTORNEY

INVENTOR
LOUIS W. DROEL
BY T. L. Bowes
ATTORNEY

July 10, 1956 L. W. DROEL 2,754,371

TELEPHONE SUBSET

Filed April 23, 1952 4 Sheets-Sheet 4

INVENTOR
LOUIS W. DROEL

BY T. L. Bowes

ATTORNEY 2,754,371

TELEPHONE SUBSET

Louis W. Droel, Rochester, N. Y., assignor, by mesne assignments, to General Dynamics Corporation, a corporation of Delaware Application April 23, 1952, Serial No. 283,942

9 Claims. (Cl. 179—100)

This invention relates to telephone substation apparatus and more particularly to telephone subscribers' subsets.

Substation apparatus for use in telephone systems includes a telephone instrument comprising a handset having incorporated therein a transmitter and a receiver at opposite ends of a hand gripping device or handle and a subset including a dial, ringing apparatus, and associated parts mounted on a suitable base within a suitable housing, there being provided a suitable cradle portion for receiving the handset when the instrument is not being used.

It is an object of the present invention to provide a telephone subset in which the parts are arranged for better accessibility and ease of assembly, repair, and replacement.

It is another object of this invention to provide, in a telephone subset a new and improved hookswitch arrangement.

Still another object of the present invention is to provide, in a telephone subset, a new and improved method of connecting cradle-plunger pieces to a pivotal hookswitch arm.

A further object of the present invention is to provide a telephone subset which is readily adapted for use in either a horizontal or a vertical position, i. e., as a subset of the desk or wall type.

Still another object of this invention is to provide a telephone subset which is readily adapted for use in either horizontal or vertical positions by the substitution only of different cardle-plunger means and the positioning of a dial in a different position.

Still another object of this invention is to provide a telephone subset hookswitch assembly in which all of the parts are supported on a base which is independent of the enclosing housing, whereby maintenance and inspection is facilitated.

Figures 1, 2:
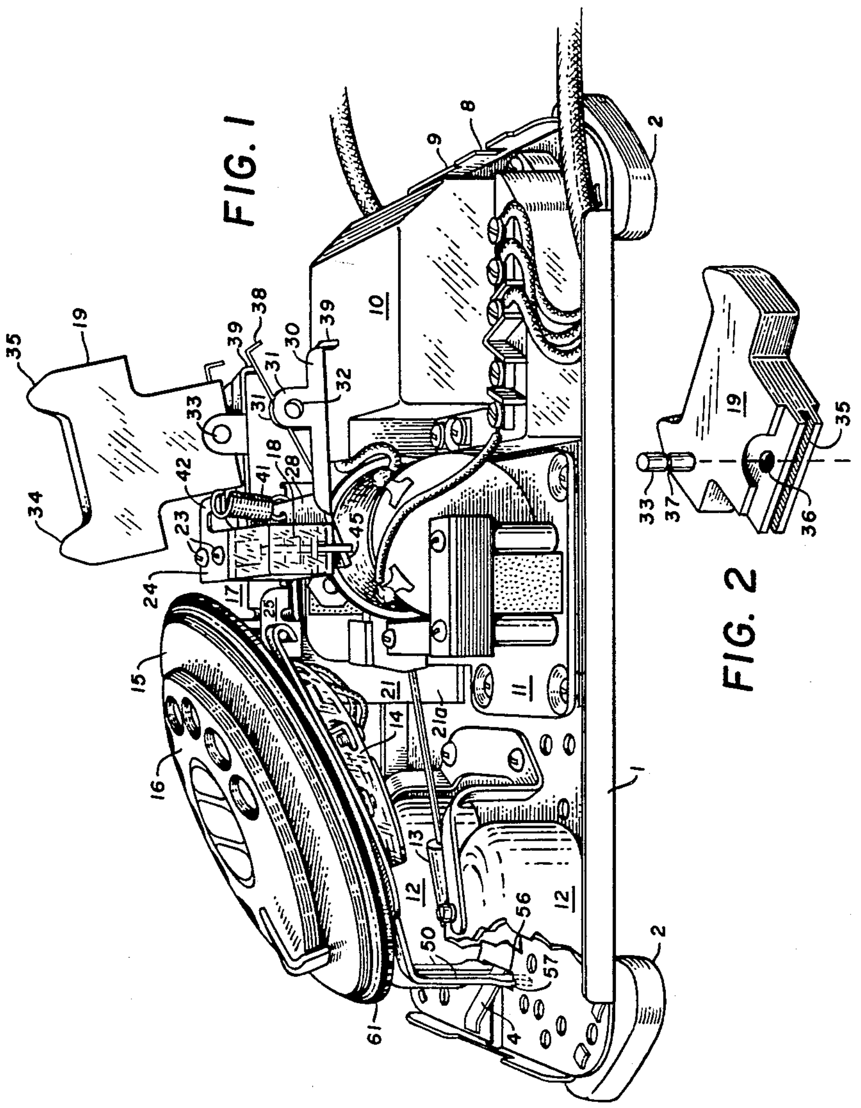
Figures 3, 4:
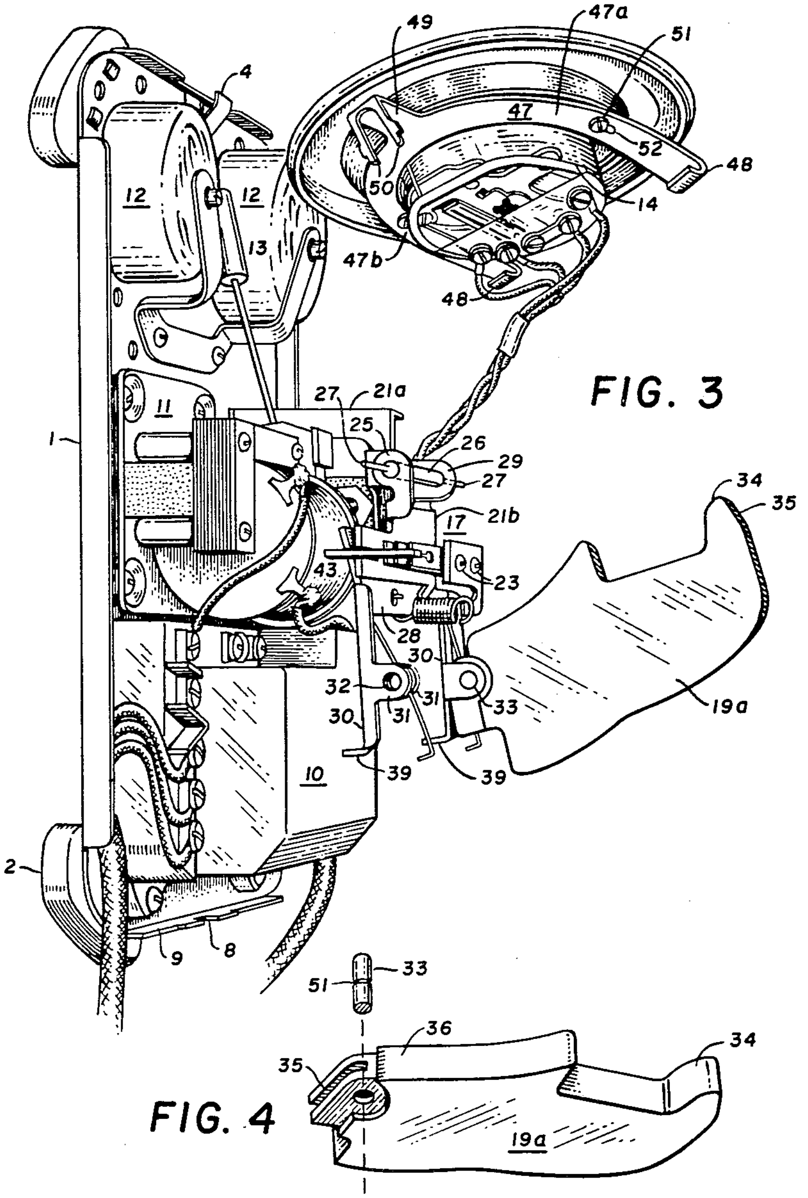
Figures 5, 6:
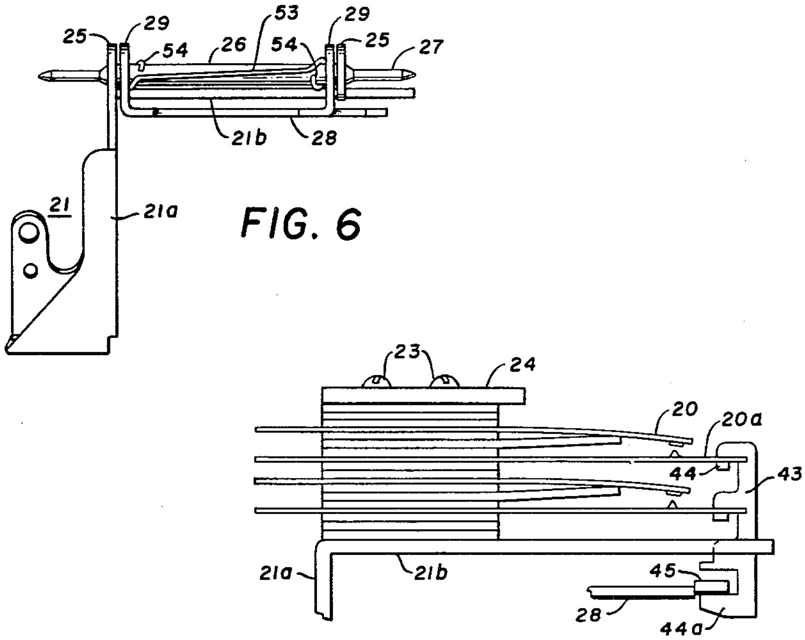
Figure 7:
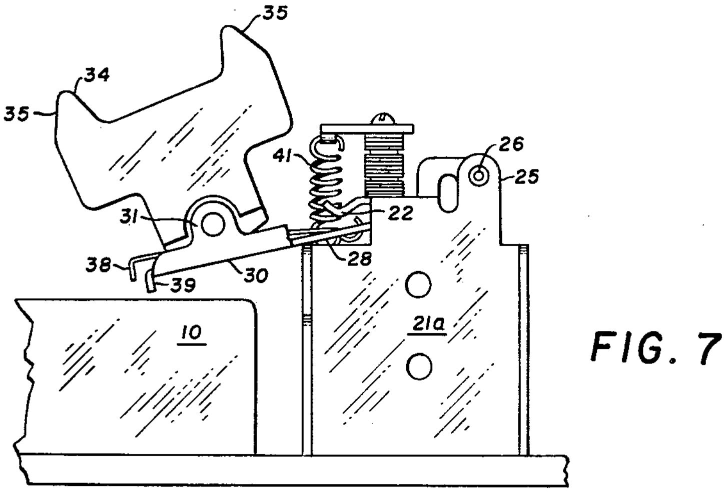
Figures 8, 9:
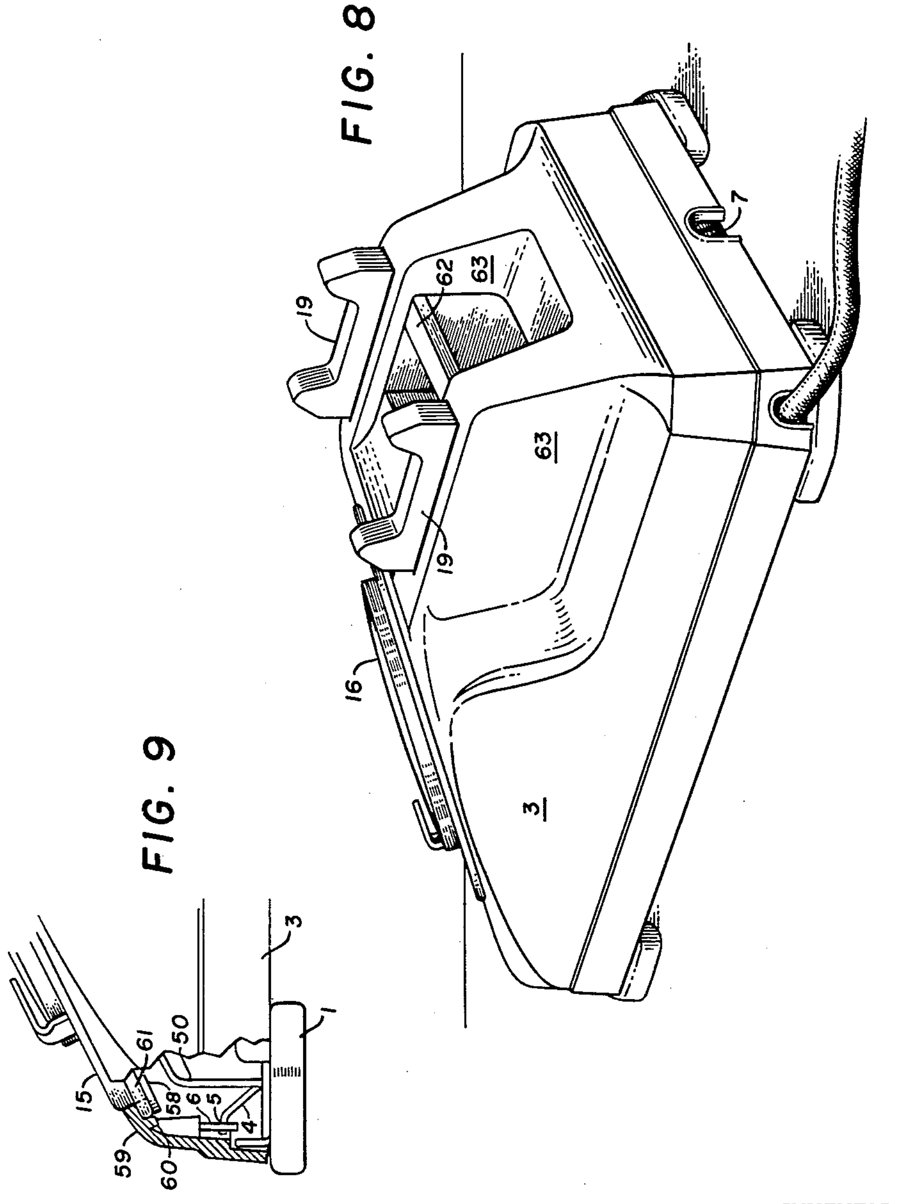

The features of this invention which are believed to be novel are set forth with particularity in the appended claims. The invention itself, both as to its organization and manner of operation, together with further objects and advantages thereof, may best be understood by reference to the following description taken in connection with the accompanying drawing in which Fig. 1 is a perspective view of a desk type subset in partially disassembled condition whereby the relationship of the various parts is disclosed; Fig. 2 is a view of a combination plunger and cradle member employed in the desk type subset of Fig. 1; Fig. 3 illustrates the use of the subset of Fig. 1 in a wall type subset; Fig. 4 illustrates a combination cradle and plunger member for use in connection with the wall type subset of Fig. 3; Figs. 5, 6, and 7 are detailed views of parts of the assembly illustrated generally in Figs. 1 and 3 which is described in detail in co-pending application Serial No. 283,941 of Louis W. Droel et al., filed April 23, 1952, and assigned to the same assignee as the present invention; Fig. 8 shows an assembled subset; and Fig. 9 shows a detail of the housing shown in Fig. 8.

Referring to the drawings, there is illustrated a subset including a suitable base 1 which may be mounted on pads 2 of any suitable material, such as rubber for example. The base 1 is arranged to support a suitable housing 3, of any suitable material such as suitable thermo plastic or metal. The housing 3 may be secured to base 1 in any suitable manner, as for example by an upwardly directed tongue 4 extending into a suitable slot 5 in a suitable bracket 6 carried by or molded into the inner surface of the front wall of housing 3. The housing may be secured at the back as by means of a suitable fastening member such as screw 7 extending through a suitable slot 8 in the upstanding flange 9 located along the rear edge of base 1.

Housing 3 cooperates with base 1 to define a space for receiving the various parts comprising the subset. Thus there is mounted on base 1 within housing 3 a subhousing 10 which may contain a suitable condenser and inductance coil and also serve as a terminal block, as illustrated. There is also mounted on base 1 a suitable ringer assembly which may comprise, for example, a suitable magnetic assembly 11, bells 12, and clapper 13. A ringer assembly of the type illustrated is shown and claimed in the copending application of Arthur S. Howell, Serial No. 256,578, filed November 15, 1951, and assigned to the same assignee as the present invention. At the front portion of the subset shown in Fig. 1 or the upper portion of the subset shown in Fig. 3, there is mounted a suitable dial assembly comprising a dirt-proof housing 14 enclosing the working parts of the dial assembly, a suitable member plate 15, and a suitable finger-operated dial 16.

In order to control the electrical circuits of which the subset apparatus forms a part, a suitable hookswitch assembly 17 is provided. If desired, a suitable removable protective covering 18 may be provided. In order to support the conventional handset there is provided in the arrangement shown in Fig. 1 a pair of plungers 19, only one of which is shown, and in Fig. 3 there is shown a different form of plunger **19*a*. Plunger members 19 and 19*a*** also embody the function of the conventional cradle.

Referring to the drawings in greater detail, the hookswitch assembly 17 includes a plurality of fixed and movable contact springs 20 and **20*a*, respectively, as best seen in Fig. 5 and may be carried on a substantially L-shaped support or bracket 21 having, as seen in Fig. 1, a vertical portion 21*a* and horizontal portion 21*b*. The portion 21*a* is suitably secured to base 1 as by means of suitable laterally extending flanges suitably secured to base 1 as by means of screws, for example. The contact spring assembly 17 may be supported from the portion 21*b* in any suitable manner as by means of screws 23 extending through suitable openings in top plate 24 and the conventional insulating spacers and contact springs of the hookswitch assembly into threaded engagement with suitably threaded openings in the portion 21*b***.

The portion **21*b* of the L-shaped bracket 21 is also used to support the plungers and hookswitch operating mechanism. For this purpose the portion 21*b* is provided with a pair of spaced apart upstanding ears 25 having aligned openings to receive the enlarged central portion of hookswitch bearing pin 26, as best seen in Fig. 3. The bearing pin in the form of a longitudinally extending member, has reduced portions 27 extending beyond the ears 25 for a purpose to be explained later. There is also pivotally carried by the bearing pin a horizontally disposed mounting member or hookswitch lever 28 by means of spaced-apart outwardly extending ears 29 having aligned openings through which the enlarged portion 26** of the bearing pin also extends.

As best seen in Figs. 3 and 6 the ears 29 are disposed within ears 25 and the spacing between ears 29 is such that there is no substantial axial movement of the horizontal mounting member 28 upon pin 26. Lever 28 is also provided with a pair of spaced-apart lateral extensions or arms 30. Each extension 30 has a pair of offset ears 31 having aligned openings 32. Between each pair of ears 31 there is located a plunger 19 or 19*a*. The upper end of each plunger 19 is provided with a pair of tines 34 to provide a seat or cradle for a handset when the telephone instrument is not in use. These tines may be provided with inclined portions 35 to assist in guiding the housing 3 into position and to minimize any chance of having the plungers wedge inside of housing 3 during the application of the housing to the instrument.

As best seen in Fig. 2 plunger 19 is provided with a longitudinally extending slot 35 in the surface or edge opposite the cradle portion as well as an opening 36 so disposed as to line up with openings 32 when plunger 19 is placed between ears 31. The plunger may be held in position by means of a pin 33 inserted through ears 31 and opening 36. In order to insure the retention of pins 33 in the proper position, each pin is provided with an annular groove 37 to receive a suitable longitudinally extending spring 38 securely fastened in any desired manner at one end to the lever 28 and extending through slot 35 between pin 33 and arm 30. It will be understood that spring 38, in the assembly shown, is tensioned to move upwardly against pin 33 and thereby to remain in engagement with pin 33 on the lower side thereof and within groove 37. The foregoing arrangement normally holds the plunger in the assembled position. In order to remove the plunger, as when it is desired to substitute plunger 19*a* in order to convert the subset of Fig. 1 to a wall type subset as shown in Fig. 3, it is simply necessary to move retaining means or spring 38 downwardly to a position free of pin 33, thus withdrawing the retaining spring 38 for permitting removal of pin 33, and then to push pin 33 out through the aligned openings, whereupon plunger 19*a* may be inserted in place and the assembly completed by insertion of pin 33.

Springs 38 also tend to bias the plungers 19 or 19*a* to the position shown in Figs. 1 and 3, respectively, which further facilitates the assembly of housing 3 because as the housing 3 is moved vertically downward the edges of the openings through which the plungers are intended to project strike the chamfered portions 35 of tines 34.

In order to limit the amount of movement of portion or lever 28 when the receiver is placed in the cradle, suitable stop means is provided. For this purpose, as best seen in Fig. 7, lever 28 strikes a corner of portion 21*a* of bracket 21. To provide additional stop means effective in case unusual pressure is applied to the plunger, the extension members 30 are provided with downwardly turned portions 39 so arranged as to engage the upper surface of block or subhousing 10. Of course, it is within the scope of the invention to provide any other suitable stop means. Suitable means is also provided to limit the movement of horizontal member 28 in the opposite direction when the handset is removed from the cradle. This stop may be in the form of an extension or tab 22 (see Fig. 7) arranged to engage lever 28.

In order to cause the plunger assembly to move to the hookswitch operating position, there is provided a suitable helical spring 41 which may be secured at its lower end to lever 28 and at its upper end to arm 42 which constitutes a lateral extension of top plate 24.

In order to effect movement of the movable contact springs responsive to pivotal movement of lever 28, there is provided a suitable operating member or pusher 43, of insulating material, having laterally extending arms 44 for engagement with the movable contact springs 20*a* as best indicated in Fig. 7. It will be seen that lever 28 has an extension or tab 45 so adjusted as to engage lower arm 44*a* of operating member 43 only after a predetermined amount of pivotal movement of the plunger and lever 28. By thus providing a certain amount of lost motion, the hookswitch contacts are not operated until near the end of the plunger and lever travel, thereby preventing the transmission of false pulses which might otherwise follow from minor movements of the plungers, as by accidental contact by a user of the apparatus, for example.

Means is also provided for mounting the dial assembly on base 1. In order to mount the dial assembly and number plate on the subset, there is provided a yoke or bracket 47 which, in the embodiment shown in Fig. 3 has a substantially U-shaped portion including arms 47*a* and 47*b* terminating in hook-like portions 48 for pivotal securing engagement with the reduced portions 27 of bearing pin 26. At the opposite ends of bracket 47 there is provided an angled extension 49 terminating in a bifurcated portion, the arms 50 thereof being sufficiently reduced in cross-section to provide a limited amount of springiness or resiliency. The yoke assembly is preferably secured to the underside of the dial mechanism housing 14 as by means of suitable screws 51. The screws 51 may extend through suitable openings or slots 52 in order to provide a limited amount of adjustment.

As previously indicated, the hook portions 48 provide a means for pivotally mounting the dial assembly on pin 26 whereby the bearing pin serves as a pivotal mount for both plunger and dial assemblies. By properly proportioning the hooks 48 with relation to the diameter of the enlarged portion of pin 26, and the spacing between arms 47*a* and 47*b*, the bracket member 47 has retaining engagement with the extended portions of pin 26 in the assembled position without further retaining means. However, in case it is desired to insure the retention of pin 26 in position with the dial assembly removed therefrom, there may be provided a suitable spring 53 (Fig. 6) extending between the upstanding ears 29 and having pin engaging hook portions 54 at the ends thereof.

The arms 50 of the yoke extension 49 are so arranged as to be inserted in a suitable opening such as slot 56 in base 1 as best shown in Fig. 1, whereby bracket member 47 is provided with a base engaging portion 49. The outer edges of arms 50 are provided with shoulder portions 57 in such a position as to accurately locate the dial assembly by limiting the movement of arms 50 through the opening. During assembly, the yoke is positioned so that the hook portions 48 engage the ends 27 of pin 26. Then by applying a slight amount of pressure to the lower or front edge of the number plate 15, the arms 50 may be pressed downwardly in slot 56 until the shoulders 57 engage base 1.

Housing 3 is provided with an opening to permit the dial 16 and number plate 15 to project therethrough. In order further to positively locate the dial assembly, the number plate 15 may be provided with a suitable shoulder or ledge 58 so disposed as to receive a gasket 61. The rim 59 of housing 3 then presses against gasket 61. Housing 3 is provided with a depending flange 60 for laterally maintaining gasket 61 in place.

As previously indicated, Figs. 1 and 2 are illustrative of a desk type subset embodying the principles of the present invention and Figs. 3 and 4 are illustrative of a wall type subset embodying the principles of the present invention. Figs. 2 and 4 show the shape of suitable combination plunger and cradle members for use with the respective types of subset. By means of the dial mounting member and the interchangeable plungers, conversion of a subset from desk type to wall type, or vice versa, simply requires the substitution of one set of plungers for the other, the removal of screws 51 holding the yoke 47 to the dial assembly, rotating the dial assembly 180° and then re-inserting screws 51.

In order to lend strength to the housing assembly and to provide portability, there is provided, as by molding, a bar 62 extending between pedestal housing portions 63.

The support of the plungers 19 or **19*a***, as well as the dial, from the same bearing pin, and the specifically illustrated means for retaining the bearing pin are covered by the copending application of Thaddeus W. Kucharski and Louis W. Droel, Serial No. 283,941, filed April 23, 1952, assigned to the same assignee as the present invention.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In a telephone subset, a plunger cradle member adapted for supporting a handset, a member for pivotally carrying said plunger cradle member, said carrying member having a pair of spaced-apart offset portions with aligned openings, said plunger cradle member being disposed between said portions and having an opening aligned with the first-mentioned openings, a slot across an edge of said plunger cradle member, a pin extending through said aligned openings, said pin having an annular groove intermediate said ends and corresponding to the position of said slot, and means engaging said groove for retaining said pin in place.

2. In a telephone subset, a plunger cradle member adapted for supporting a handset, a member for pivotally carrying said plunger cradle member, said carrying member having a pair of spaced-apart offset portions with aligned openings, said plunger cradle member being disposed between said portions, said plunger cradle member having an opening aligned with the first-mentioned openings and a slot across an edge thereof, a pin extending through said aligned openings, said pin having an annular groove intermediate said ends and corresponding to the position of said slot, means engaging said groove for retaining said pin in place, and means for withdrawing said retaining means for permitting the removal of said pin to enable the removal of said plunger cradle member.

3. In a telephone subset, a plunger cradle member adapted for supporting a handset, a member for pivotally carrying said plunger cradle member, said carrying member having a pair of spaced-apart offset portions with aligned openings, said plunger cradle member being disposed between said portions, said plunger cradle member having an opening aligned with the first-mentioned openings and a slot across an edge thereof, a pin extending through said aligned openings, said pin having an annular groove intermediate said ends and corresponding to the position of said slot, a longitudinally extending spring secured at one end to said carrying member and extending through said slot and between said portions, said spring being tensioned to engage said groove in said pin for retaining said pin in place.

4. In a telephone subset, a plunger cradle member adapted for supporting a handset, a member for pivotally carrying said plunger cradle member, said carrying member having a pair of spaced-apart offset portions with aligned openings, said plunger cradle member being disposed between said portions, said plunger cradle member having an opening aligned with the first-mentioned openings, and a slot across an edge thereof, a pin extending through said aligned openings, said pin having an annular groove intermediate said ends and corresponding to the position of said slot, a longitudinally extending spring secured at one end to said carrying member and extending through said slot and between said portions, said spring being tensioned to engage said groove in said pin for retaining said pin in place, and means for moving said spring out of engagement with said groove to permit the removal of said pin and said plunger cradle member.

5. In a telephone subset, a base, a support carried by said base and having a pair of spaced-apart offset ears, said ears having aligned openings, a member, said member having a pair of spaced-apart offset ears with aligned openings disposed between the first-mentioned ears, a bearing pin extending through said aligned openings whereby said member is pivotally supported by said support, said pivotal member having a pair of spaced-apart arms, each of said arms having a pair of offset portions, said portions having aligned openings, a plunger cradle member disposed between each pair of portions, each plunger cradle member having an opening aligned with the afore-mentioned openings in said portions, a pin extending through said openings in said plunger cradle member and said portions associated therewith, each pin having an annular groove intermediate its end, a longitudinal spring extending between each pair of portions and between each pin and the associated arm, each spring being secured at one end to the associated arm and tensioned to engage said groove in said pin for maintaining said plunger cradle members in position.

6. In a telephone subset, a base, a support carried by said base and having a pair of spaced-apart offset ears, said ears having aligned openings, a member, said member having a pair of spaced-apart offset ears with aligned openings between the first-mentioned ears, a bearing pin extending through said aligned openings whereby said member is pivotally supported by said support, said pivotal member having a pair of spaced-apart arms, each of said arms having a pair of offset portions, said portions having aligned openings, a plunger cradle member disposed between each pair of portions, each plunger cradle member having an opening aligned with the afore-mentioned openings in said portions, a pin extending through said openings in said plunger cradle member and the portions associated therewith, each pin having an annular groove intermediate its end, a longitudinal spring extending between each pair of portions and between each pin and the associated arm, each spring being secured at one end to the associated arm and tensioned to engage said groove in said pin for maintaining said plunger cradle members in position, and means for disengaging said spring from said groove to enable the removal of said pin and hence the removal of said plunger cradle member.

7. In a telephone subset, a base, a support carried by said base and having a pair of spaced-apart offset ears, said ears having aligned openings, a member, said member having a pair of spaced-apart offset ears with aligned openings, a bearing pin extending through both pairs of aligned openings whereby said member is pivotally supported by said support, said pivotal member having a pair of spaced-apart arms, each of said arms having a pair of upstanding portions, said portions having aligned openings, a plunger cradle member disposed between each pair of portions, each plunger cradle member having an opening aligned with the afore-mentioned openings in said portions, a pin extending through the opening in each plunger cradle member and the portions associated therewith, each pin having an annular groove intermediate its end, a longitudinal spring extending between each pair of portions and between each pin and associated arm, each spring being secured at one end to the associated arm and tensioned to engage said groove in said pin for maintaining said plunger cradle members in position, means for disengaging said spring from said groove to enable the removal of said pin and hence the removal of said plunger cradle member, and means for biasing said pivotal member outwardly from said base whereby said pivotal member moves away from said base in the absence of restraint on said plunger member.

8. In a telephone subset, a base, a support carried by said base and having a pair of spaced-apart offset ears, said ears having aligned openings, a member, said member having a pair of spaced-apart offset ears with aligned openings, a bearing pin extending through both pairs of aligned openings whereby said member is pivotally supported by said support, said pivotal member having a pair of spaced-apart arms, each of said arms having a pair of upstanding portions, said portions having aligned openings, a plunger cradle member disposed between each pair of portions, each plunger cradle member having an opening aligned with the afore-mentioned openings in said portions, a pin extending through the opening in each plunger cradle member and the portions associated therewith, each pin having an annular groove intermediate its end, a longitudinal spring extending between each pair of portions and between each pin and associated arm, each spring being secured at one end to the associated arm and tensioned to engage said groove in said pin for maintaining said plunger cradle members in position, means for disengaging said spring from said groove to enable the removal of said pin and hence the removal of said plunger cradle member, means for biasing said pivotal member outwardly from said base whereby said pivotal member moves away from said base in the absence of restraint on said plunger cradle members, and means for limiting said outward movement.

9. In a telephone subset, a base, a support carried by said base and having a pair of spaced-apart offset ears, said ears having aligned openings, a member, said member having a pair of spaced-apart offset ears with aligned openings, a bearing pin extending through both pairs of aligned openings whereby said member is pivotally supported by said support, said pivotal member having a pair of spaced-apart arms, each of said arms having a pair of upstanding portions, said portions having aligned openings, a plunger cradle member disposed between each pair of portions, each plunger cradle member having an opening aligned with the afore-mentioned openings in said portions, a pin extending through the opening in each plunger cradle member and the portions associated therewith, each pin having an annular groove intermediate its end, a longitudinal spring extending between each pair of portions and between each pin and associated arm, each spring being secured at one end to the associated arm and tensioned to engage said groove in said pin for maintaining said plunger cradle members in position, means for disengaging said spring from said groove to enable the removal of said pin and hence the removal of said plunger cradle member, means for limiting movement of said plunger cradle member away from said base, and means for limiting movement of said plunger cradle member toward said base.

References Cited in the file of this patent

UNITED STATES PATENTS

| | | |
|---|---|---|
| 1,762,641 | Schneider | June 10, 1930 |
| 2,008,287 | Lum | July 16, 1935 |
| 2,196,417 | Kelsen | Apr. 9, 1940 |
| 2,279,713 | McLarn | Apr. 14, 1942 |
| 2,369,344 | Ehmann | Feb. 13, 1945 |

FOREIGN PATENTS

| | | |
|---|---|---|
| 358,921 | Great Britain | Oct. 14, 1931 |